(12) United States Patent
Ayers et al.

(10) Patent No.: US 12,538,213 B2
(45) Date of Patent: Jan. 27, 2026

(54) PER-IMSI APN OI REPLACEMENT AVP PARAMETERS AND SUPPRESSION ATTRIBUTE SETTINGS FOR MIMM SUBSCRIBERS

(71) Applicant: HEWLETT PACKARD ENTERPRISE DEVELOPMENT LP, Spring, TX (US)

(72) Inventors: John Ayers, Omaha, NE (US); Tiffany Moore, Omaha, NE (US); Gary Alan Blatch, Hampshire (GB); Mathew Mathew Kaippallimalil, Plano, TX (US); Matthew A. Johnson, Omaha, NE (US); Carlos Alberto Galamba Galvão, Sobreda (PT)

(73) Assignee: Hewlett Packard Enterprise Development LP, Spring, TX (US)

( * ) Notice: Subject to any disclaimer, the term of this patent is extended or adjusted under 35 U.S.C. 154(b) by 561 days.

(21) Appl. No.: 18/160,493

(22) Filed: Jan. 27, 2023

(65) Prior Publication Data

US 2024/0259918 A1 Aug. 1, 2024

(51) Int. Cl.
*H04W 48/16* (2009.01)
*H04W 8/24* (2009.01)

(52) U.S. Cl.
CPC ............. *H04W 48/16* (2013.01); *H04W 8/24* (2013.01)

(58) Field of Classification Search
CPC ................................ H04W 48/16; H04W 8/24

USPC ........................................................ 370/329
See application file for complete search history.

(56) References Cited

U.S. PATENT DOCUMENTS

| | | | | |
|---|---|---|---|---|
| 2011/0217978 | A1* | 9/2011 | Horn ..................... | H04W 8/186 455/433 |
| 2015/0327110 | A1* | 11/2015 | Jeong ................ | H04W 28/0215 370/338 |
| 2015/0327207 | A1* | 11/2015 | Bharadwaj .......... | H04L 65/4061 455/435.2 |
| 2019/0239147 | A1* | 8/2019 | Chun .................... | H04W 88/06 |

* cited by examiner

*Primary Examiner* — Christopher M Crutchfield
*Assistant Examiner* — Jean F Voltaire
(74) *Attorney, Agent, or Firm* — Jones Robb PLLC (57) ABSTRACT

A method for applying per-International Mobile Subscriber Identification (IMSI) Access Point Name (APN) Operator Identifier (OI) replacement for Multiple IMSI Multiple Mobile Subscriber Integrated Service Digital Network (MSISDN) subscribers comprises receiving, at a home subscriber server of a cellular network, an identification of a currently active IMSI for a cellular device. The cellular device is associated with a cellular service subscriber having multiple IMSIs and multiple MSISDNs, the multiple IMSIs comprise a primary IMSI and one or more secondary IMSIs, and each of the IMSIs has an associated roaming COS that includes a roaming restriction policy that allows or suppresses Voice Over LTE (VOLTE). In response to the currently active IMSI for the cellular device being a secondary IMSI, the method comprises applying the roaming restriction policy specified in the roaming COS of the secondary IMSI regardless of the roaming COS of the primary IMSI.

20 Claims, 5 Drawing Sheets

PER-IMSI APN OI REPLACEMENT AVP PARAMETERS AND SUPPRESSION ATTRIBUTE SETTINGS FOR MIMM SUBSCRIBERS

BACKGROUND

Mobile communication device users are associated with service-provider-specific subscriptions or profiles that identify them (and/or their device(s)) to cellular service providers. Typically, such subscriptions/profiles are associated with an International Mobile Subscriber Identification (IMSI) and a Mobile Subscriber Integrated Service Digital Network (MSISDN) number. An IMSI is an internationally standardized unique number that identifies the mobile subscriber to the cellular service provider. An MSISDN is a number used to establish a connection with a mobile user (e.g., the telephone number that is dialed to establish a connection with a cellular service subscriber). While a single profile corresponds to a single mobile communications user or subscriber, in some networks a single subscriber may be associated with multiple IMSIs and multiple MSISDNs, a capability referred to as Multiple IMSIs Multiple MSISDNs (MIMMs). Multiple IMSIs Multiple MSISDNs are useful, for instance, for subscribers that frequently travel between geographic areas having different service capabilities such that accessing the cellular network in that area using, for instance, an IMSI having different service permissions and/or restrictions than another, may be advantageous.

A subscriber's IMSI and MSISDN (or MIMMs) are stored in a database (e.g., a Home Subscriber Server (HSS) and/or Home Location Register (HLR)) that includes the profiles/subscriptions for all subscribers in a given cellular service provider's network.

BRIEF DESCRIPTION OF THE DRAWINGS

Various examples will be described below with reference to the following figures.

Throughout the drawings, identical reference numbers designate similar, but not necessarily identical, elements. Moreover, the drawings provide examples and/or implementations consistent with the description; however, the description is not limited to the examples and/or implementations provided in the drawings.

DETAILED DESCRIPTION

Cellular service subscribers configured with MIMMs typically have a primary IMSI and one or more secondary IMSIs. The primary IMSI generally is associated with a "home area," which may be the user's primary geographic area of residence or some other geographic area where the user spends a portion of their time. Each secondary IMSI may be associated with another geographic area, such as geographic areas to which the user travels. Generally, the secondary IMSIs may be for geographical areas that include service capabilities and/or restrictions (e.g., roaming capabilities and/or restrictions) that differ from those of the home area.

Various rules (e.g., roaming restrictions), policies, and/or other parameters may control the network's behavior in relation to a cellular device, such as whether the network provides certain services or enables certain functionalities for the cellular device, and these rules/policies/parameters may be specified in a user profile of the user. For example, a class of service (COS) may be associated with a user (or with individual IMSIs of the user), and this COS may have various rules, policies, and/or other parameters associated therewith that control the services or functionalities provided to the user's cellular device. These rules/policies/parameters may be referred to herein as "COS parameters." With regard to primary IMSIs, among these COS parameters is a parameter that controls whether voice-over-LTE (VOLTE) functionality will be allowed for the user. This parameter is referred to as an Access Point Name ("APN") Operator Identifier ("OI") Replacement Attribute Value Pair ("AVP") Suppression attribute setting and will be described in greater detail below.

When a user with MIMMs is utilizing a secondary IMSI, the network may apply the APN OI Replacement AVP Suppression attribute setting as specified in a COS for a primary IMSI as only the primary IMSI of the MIMMs includes this COS parameter. In other words, the APN OI Replacement AVP Suppression attribute setting specified in the COS for the primary IMSI may be controlling regardless of which IMSI is currently being used. One effect of this may be that VOLTE is allowed or denied for all of the IMSIs of the subscriber based on whether VOLTE is allowed or denied for the primary IMSI of the subscriber. However, this may be undesirable in some circumstances because the service provider may desire to provide VOLTE for some IMSIs of a MIMM subscriber but not for others, but currently, this is not possible. For example, a service provider may desire to allow VOLTE in one region associated with one IMSI but not in others (or vice versa), but this might not be possible because whichever APN OI Replacement Suppression attribute setting is specified in the COS for the home area of the user (which is usually associated with the primary IMSI) will be used even when the user is in a different region (associated with a secondary IMSI).

To address these issues, examples disclosed herein allow the primary IMSI and the secondary IMSIs to have different APN OI Replacement AVP Suppression attribute settings, and moreover, to make these APN OI Replacement AVP Suppression attribute settings effectual on a per-IMSI basis. That is, in examples disclosed herein, when one of the secondary IMSIs is the currently active IMSI for the user, then the setting for the APN OI Replacement AVP Suppression attribute may be specified in a COS for the currently active secondary IMSI, and this secondary IMSI's APN OI Replacement AVP Suppression attribute setting will be applied for that user regardless of the APN OI Replacement AVP Suppression attribute setting specified in the COS of the primary IMSI. Additionally, examples disclosed herein allow the secondary IMSIs to be associated with IMSI-specific APN OI Replacement AVP parameters. Thus, in circumstances where the IMSI-specific APN OI Replacement AVP Suppression setting permits the application of the APN OI Replacement AVP parameter, the APN OI Replacement AVP parameter may be IMSI-specific as well. In this way, examples disclosed herein allow a service provider to provide different services or functionalities to the different IMSIs of a MIMM user by specifying different APN OI Replacement AVP Suppression attribute settings and, where applicable, different APN OI Replacement AVP parameters for these IMSIs. These and other aspects of the examples disclosed herein will be described in greater detail below.

Cellular devices include a Subscriber Identification Module (SIM) generally stored on a SIM card installed on the cellular device. A SIM has an IMSI associated therewith that identifies the mobile subscriber associated with the device and a corresponding MSISDN. As each SIM is associated with a single IMSI, cellular service subscribers configured with MIMMs require multiple SIMs for service access. In some instances, a single SIM card may be associated with a single SIM and thus a single IMSI. In such instances, to change to a different IMSI (e.g., when the subscriber travels to a different geographic region having different service capabilities), the SIM card may be removed from the cellular device and replaced by another SIM card associated with a different IMSI corresponding to the same subscriber. In other instances, a single SIM card may be associated with multiple SIMs and thus multiple IMSIs. In such instances, to change to a different IMSI, the subscriber may select a different IMSI (for instance, in the cellular device's configuration settings), or logic within the cellular device may be capable of detecting when a different IMSI would be advantageous and automatically select said IMSI without user intervention.

When a cellular device newly connects with a network (e.g., upon first powering on or toggling on cellular communications) or changes its connection to the network (e.g., by moving into a different service area and/or changing an IMSI), several parameters are forwarded from the device to a network switch to identify and register the device/user in the network. Each parameter is presented as an Attribute Value Pair (AVP). AVPs include an attribute and a value. For instance, one parameter may include an AVP wherein the attribute is 'Subscriber ID', and the value is the IMSI associated with the subscriber (or manually or automatically selected IMSI where there are multiple). Upon receiving the parameters, the network switch may consult the database of stored subscriber information (e.g., the HSS and/or HLR) and use at least a portion of the provided parameters to identify a profile of the subscriber. Once a subscriber is identified, various settings or rules associated with the IMSI(s) of the user will be identified, and these will be used by the network to determine, among other things, which services and functionalities to enable for the device. In addition, a number of communications (which may be or include parameters (and thus AVPs)) may be forwarded from the switch to the device such that service may be provided. Such parameters may include, by way of example only, charging characteristics, feature activation elements, APN OI Replacement AVP parameters (more fully described below), and the like.

For each subscriber IMSI, the subscriber's profile may include one or more associated roaming classes of service (COSs) that identify a grouping or category of subscribers to which the user belongs with respect to roaming permissions and/or restrictions. Roaming COSs allow network operators to manage a subscriber's roaming based on, for example, geographical, locational, or network identification considerations. For instance, a particular roaming COS may allow a subscriber (as a member of a group of subscribers) to roam in certain parts of the United States but not in other parts (e.g., a "west coast roaming COS" which may indicate that the subscriber is permitted to roam for mobile networks in a "west coast" geographical area, for instance, identified through a home address of the subscriber). As another example, a particular roaming COS may identify a subscriber as a VIP subscriber (e.g., a "VIP subscriber roaming COS" which may indicate that the subscriber is a high-priority network subscriber whose roaming permissions are unaffected by geographical or network parameters). As another example, certain features may be available in some geographic areas and not in others. In such instances, a roaming COS may restrict certain capabilities in areas where the capabilities are not available while permitting the capabilities in areas where the capabilities are available. The various rules and restrictions associated with a given COS may be reflected as parameters stored in a profile of the user, with the settings or values of these parameters controlling various aspects of the services provided to a user associated with the given COS. These settings may be made on a per-IMSI basis. That is, each IMSI of a MIMM subscriber may have its own associated COS, and in the user profile of that subscriber, respective sets of parameters associated with a COS may be stored for these IMSIs.

As noted above, the COS parameters may include an APN OI Replacement AVP Suppression attribute, which controls whether the value of the APN OI Replacement AVP parameter is excluded or included in the user profile information that is downloaded to a device for effecting service and, thus, whether VOLTE is allowed or denied. In Evolved Packet Core (EPC), APN OI is an optional part of the APN that defines in which Public Land Mobile Network (PLMN) the Packet Data Network (PDN) Gateway (GW) (or GPRS Support Node (GGSN) for General Packet Radio Service (GPRS)) is located. In effect, APN OI is a "domain name" for the network operator. APN OI AVP replacement refers to replacing the "standard" or "default" APN OI AVP associated with an IMSI with some replacement value. This APN OI Replacement AVP parameter may be specified in a field of the user profile which specifies a different APN OI AVP than a default APN OI AVP associated with a given primary IMSI. The value in the APN OI Replacement AVP field, when the APN OI Replacement AVP Suppression attribute of an associated COS allows it, replaces the default APN OI AVP derived from the IMSI. This in turn can have the effect of changing (by the network operator) the PLMN or GGSN through which the subscriber's mobile communications travel. This change in PLMN or GGSN may be used, for example, to change between providing conventional telephone communication to a device and providing VOLTE to the device. However, it is not always desired to allow such a change in the value of the APN OI AVP parameter. Accordingly, COSs associated with primary IMSIs include an option (e.g., configurable by the manufacturer/developer of the network switch and/or by an administrator of the system) to include or exclude the APN OI Replacement AVP parameter. In some instances, such an option may be presented as a changeable field in an interface used by the administrator that may allow the administrator to select between "Include APN OI Replacement AVP" or "Exclude APN OI Replacement AVP" for a primary IMSI of a user. In some instances, such an option may be presented as a selectable field of a graphical user interface, such as a checkbox, a dropdown menu, a radio dial, or another toggleable field. In some instances, whether the value of the APN OI Replacement AVP is included or excluded from a downloaded user profile is included as a roaming restriction policy in IMSI-based roaming COSs. In other words, the selection of whether to include or exclude the value of the APN OI Replacement AVP parameter is an example of an aforementioned parameter setting for a COS.

In some instances, excluding or including the value of the APN OI Replacement AVP parameter can have the effect of preventing VOLTE for subscribers using MIMMs. For SIMs with a single IMSI and MSISDN, the service provider can configure this setting as desired to either allow or prevent VOLTE, for example, based on whether VOLTE is available in the geographic region associated with the subscriber's IMSI. However, for MIMM subscribers, because they have multiple IMSIs that may be associated with different geographic regions, the service provider may desire to prevent VOLTE for some of the subscriber's IMSIs but allow it for others, for example, because VOLTE may be available in some of the associated regions while not being available in others (or at least not available to a particular subscriber in certain regions, for instance, based on their service contract). For example, if a user has a home area associated with a primary IMSI in which VOLTE is not available, the value of the APN OI Replacement AVP parameter may be excluded from the user profile for the primary IMSI. But, as the user travels into an area where VOLTE is available and switches to a secondary IMSI associated with that region, the service provider may desire to include a value for the APN OI Replacement AVP parameter rather than excluding it, thus permitting VOLTE. However, currently, this may not be possible. For example, it is currently not possible for the service provider to exclude the value of the APN OI Replacement AVP parameter from the user profile when the user is using the primary IMSI while including a value for the APN OI Replacement AVP parameter in the user profile when the user is using a secondary IMSI (or vice versa) for MIMM subscribers, for instance, as the user switches IMSIs being utilized for service. This is due to the fact that currently, the roaming restriction COS associated with the primary IMSI, including the APN OI Replacement Suppression attribute included in the primary IMSI's COS, is applied regardless of any roaming restriction COS associated with the currently active IMSI (where the currently active IMSI is not the primary IMSI). Additionally, currently, the only value for the APN OI Replacement AVP parameter is associated with the primary IMSI and, in some cases, this value may not achieve the desired effect (e.g., to allow VOLTE) when a secondary IMSI is utilized for service. As such, even if the inclusion of the AVP OI Replacement parameter is permitted in the roaming COS associated with the primary IMSI, the value of the parameter may not be a desired value when a secondary IMSI is utilized for service.

The present disclosure addresses the above issues by permitting the primary IMSI and the secondary IMSIs to have different APN OI Replacement AVP Suppression attribute settings specified in their respective roaming COSs. In other words, implementations of the present disclosure provide for per-IMSI, roaming COS-based APN OI Replacement AVP Suppression attribute settings. Moreover, the present disclosure addresses the above issues by making these APN OI Replacement AVP Suppression attribute settings effectual on a per-IMSI basis. That is, in examples disclosed herein, when one of the secondary IMSIs is the currently active IMSI for the user, then the settings for the APN OI Replacement AVP Suppression attribute as may be specified in a COS for the currently active secondary IMSI, will be applied for that user regardless of the APN OI Replacement AVP Suppression attribute setting specified in the COS of the primary IMSI. That is, rather than always using the APN OI Replacement AVP Suppression attribute for the roaming COS of the primary IMSI, the network switch will use the APN OI Replacement AVP Suppression attribute associated with whichever IMSI is currently active. Additionally, the present disclosure provides for each IMSI of a MIMM to have IMSI-specific values for APN OI Replacement AVP parameters, rather than applying the value for the APN OI Replacement AVP parameter associated with the primary IMSI whenever the APN OI Replacement AVP Suppression attribute permits the inclusion of the value of the APN OI Replacement AVP parameter. Thus, implementations of the present disclosure may allow a service provider to have finer-grained control over the capabilities of MIMM subscribers, particularly with regard to whether VOLTE is allowed or prevented in cases where MIMM subscribers are using secondary IMSIs.

At an HSS of a cellular network, an identification of a currently active IMSI and an MSISDN number for a cellular device may be received, for instance, from a network switch of the cellular network. The network switch may have received the currently active IMSI (and MSISDN number) as parameters from the cellular device upon the device registering with the network (or changing a preexisting registration), such as when the device was powered on within the cellular network, or when the device changes its IMSI (e.g., due to crossing a geographic boundary such that the use of a different IMSI became necessary or advantageous), or when the device receives an update to a database profile for an existing registration. The cellular device may be associated with a cellular service subscriber that has multiple IMSIs and multiple MSISDNs, one of the multiple IMSIs being a primary IMSI, with the remaining IMSIs being secondary IMSIs. Each of the multiple IMSIs may have an associated roaming COS that includes a roaming restriction policy that allows or suppresses VOLTE. In some implementations, the roaming restriction policy specified in the roaming COS that allows or suppresses VOLTE may comprise an APN OI Replacement AVP Suppression attribute that can be set to include or exclude the value of the APN OI Replacement AVP parameter associated with the IMSI. In some implementations, the roaming restriction policy specified in the roaming COS may be set to allow or suppress VOLTE based on whether a service contract associated with the cellular service subscriber permits VOLTE.

In response to the currently active IMSI for the cellular device being a secondary IMSI, methods in accordance with implementations of the present disclosure may apply the roaming restriction policy specified in the COS of the secondary IMSI regardless of any roaming restriction policy that may be present in the COS of the primary IMSI. Applying the roaming restriction policy specified in the COS of the secondary IMSI may permit the inclusion or exclusion of the value for APN OI Replacement AVP parameter, which may be IMSI-specific, and thus allow or suppress VOLTE for the cellular device in accordance with the roaming restriction policy specified in the COS of the secondary IMSI.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the appended claims may define the proper scope of the disclosed examples.

Figure 1:
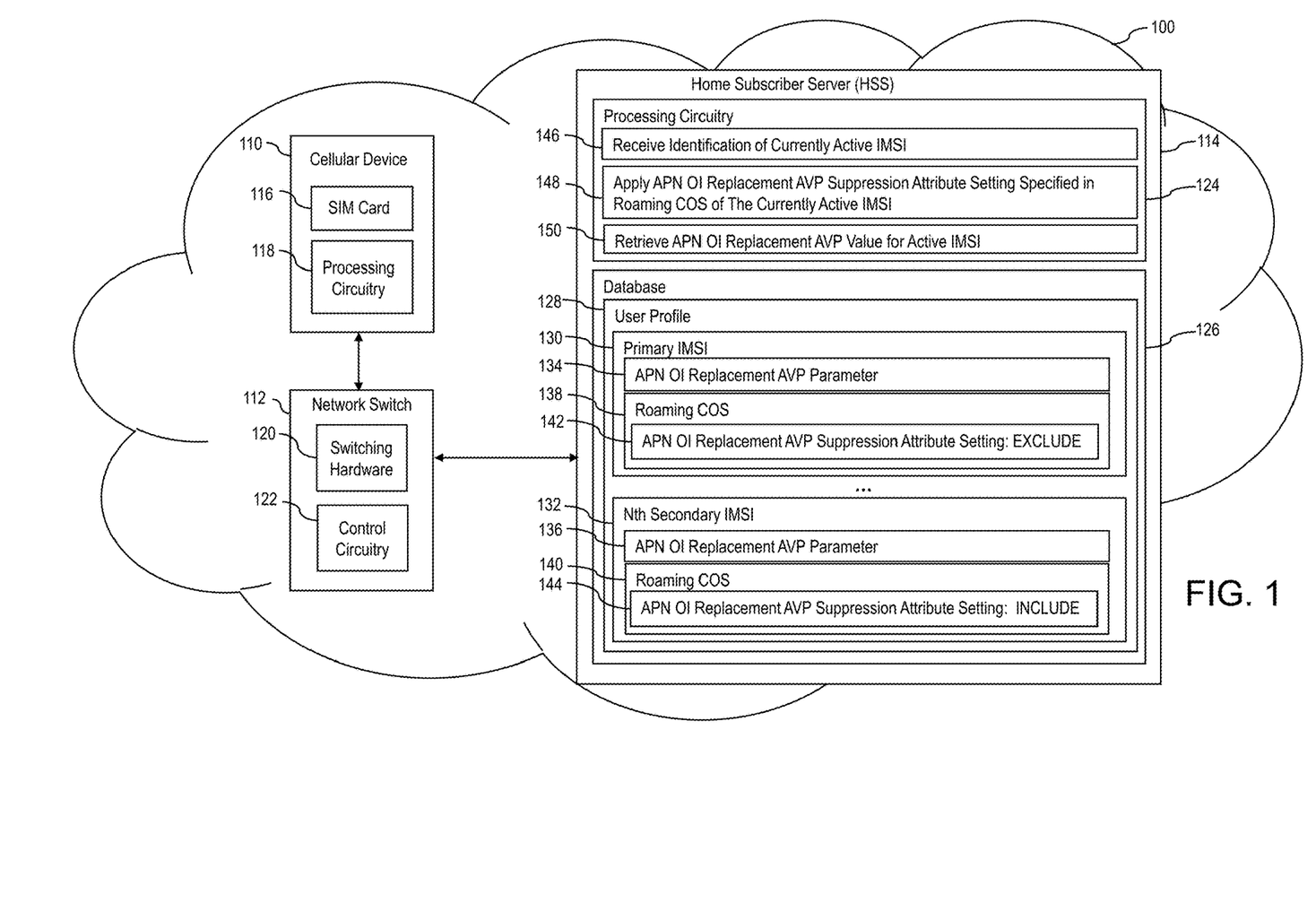
FIG. 1 is a schematic diagram of an example computing network in accordance with some implementations of the present disclosure.

FIG. 1 is a schematic diagram illustrating a cellular network 100 in accordance with some implementations of the present disclosure. Cellular network 100 includes a cellular device 110, a network switch 112, and a home subscriber server (HSS) 114. While shown with a single cellular device 110, network switch 112, and HSS 114, it will be understood that any number of cellular devices, network switches, and HSSs (or substantial equivalents thereof, e.g., HLRs) may be utilized within the scope of implementations of the present disclosure.

The cellular network 100 is configured to provide cellular service to the cellular device 110. Thus, the cellular network 100 may comprise a radio-access-network (RAN) (not illustrated) and associated access nodes or gateways (e.g., an eNodeB) to deploy a radio air interface to facilitate wireless communications with the cellular device 110. Such a RAN, as well as other aspects of the network 100, would be familiar to those of ordinary skill in the art and thus are omitted from FIG. 1 to simplify the description. The network switch 112 may be part of, or may be communicably coupled to, the RAN, thus allowing communications between the network switch 112 and the cellular device 110. The HSS 114 may be part of a so-called backhaul network, which may also include additional entities (not illustrated) such as a mobility management entity (MME), a Policy Control and Charging Rules Function (PCRF), an authentication, authorization, and accounting (AAA) node, a rights management server (RMS), a subscriber provisioning server (SPS), a policy server, etc. The network 100 may use one or more wireless network protocols for communication, such as one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE).

Cellular device 110 may be any type of cellular communication device. Cellular communication devices are known to those having ordinary skill in the art and, accordingly, cellular device 110 is not further described herein. Cellular device 110 includes a SIM card 116 and processing circuitry 118. In some implementations, SIM card 116 may be installed on cellular device 100 and include a single IMSI identifying the mobile subscriber associated with cellular device 110 and a corresponding MSISDN. In some implementations, SIM card 116 may be installed on cellular device 100 and include multiple IMSIs, each identifying the mobile subscriber associated with the cellular device, and multiple MSISDNs.

Processing circuitry 118 may comprise the underlying hardware that provides service to cellular device 110 (e.g., by executing corresponding instructions). Processing circuitry 118 comprises a processing resource (e.g., a processor, a System-on-Chip (SoC), a central processing unit (CPU), a graphical processing unit (GPU), etc.) together with a storage medium storing instructions executable by the processing resource, dedicated hardware (e.g., an application specific integrated circuit (ASIC), a field programmable gate array (FPGA), a complex programmable logic device (CPLD), etc.), or some combination thereof. The instructions and/or the dedicated hardware of processing circuitry 118 may be configured to cause the performance of the operations described herein in relation to the cellular device 110.

Processing circuitry 118 is configured to, when cellular device 110 is powered on, when cellular capability is toggled on, and/or when an IMSI is changed (e.g., upon cellular device 110 crossing a border or boundary into a geographic region corresponding to the IMSI), transmit a registration message comprising a plurality of parameters to network switch 112, the parameters including, at least, AVPs identifying the IMSI and MSISDN that are currently active. In some implementations, the currently active IMSI may be the only IMSI associated with SIM card 116. In some implementations, the currently active IMSI may be an IMSI manually selected by the subscriber among multiple IMSIs associated with SIM card 116. In some implementations, the currently active IMSI may be an IMSI automatically selected by cellular device 110 among multiple IMSIs associated with SIM card 116, for instance, based on a geographic region in which the cellular device is powered on. Any and all such variations, and any combination thereof, are contemplated to be within implementations of the present disclosure. In some implementations, the currently active IMSI may be a secondary IMSI.

Network Switch 112 includes switching hardware 120 and control circuitry 122. Switching hardware 120 comprises switching circuitry that can selectively connect ports (not shown) to allow the routing of data packets between various devices connected to network switch 112 (e.g., HSS 114). Switching hardware 120 also may comprise other related components that participate in, control, or otherwise facilitate the communication of data packets. Switching hardware of a switch is familiar to those of ordinary skill in the art, and thus switching hardware 120 is not described in greater detail herein.

Control circuitry 122 comprises circuitry configured (e.g., programmed) to perform operations described herein in relation to network switch 112. Control circuitry 122 comprises a processor and a storage medium storing instructions executable by the processor to cause the performance of operations described herein in relation to network switch 112, dedicated hardware configured to perform operations described herein in relation to network switch 112, or some combination of these. In examples in which control circuitry 122 comprises a processor, the processor may comprise one or more processing devices capable of executing machine-readable instructions, such as, for example, a processor, a CPU, a controller, a microcontroller, an SoC, a digital signal processor (DSP), a GPU, or other processing resources. In examples in which control circuitry 122 includes dedicated hardware, in addition to or in lieu of the processor, the dedicated hardware may include any electronic device that is configured with logic to perform specific operations, such as an ASIC, FPGA, CPLD, discrete logic circuits, a hardware accelerator, a hardware encoder, etc. In some examples, control circuitry 122 may be configured to control other operations of network switch 112, such as controlling operations of switching hardware 120, security/authentication operations, and/or other operations of network switch 112. Such other operations of control circuitry are familiar to those of ordinary skill in the art and thus are not described in detail herein.

Control circuitry 122 is configured to receive registration messages from cellular device 110 and, upon receipt, transmit at least one or more AVPs from the registration messages to HSS 114 for subscriber identification and/or authentication and to determine the service parameters associated with the subscriber's service contract, as they are associated with the currently active IMSI. Control circuitry 122 further is configured to receive the service parameters associated with the subscriber's service contract from HSS 114 such that service may be provided to cellular device 110.

Home Subscriber Server (HSS) 114 comprises processing circuitry 124 and a database 126. Similar to processing circuitry 118 of cellular device 110, processing circuitry 124 may comprise the underlying hardware that provides service to HSS 114 (e.g., by executing corresponding instructions). Processing circuitry 124 comprises a processing resource (e.g., a processor, an SoC, a CPU, a GPU, etc.) together with a storage medium storing instructions executable by the processing resource to perform operations described herein, dedicated hardware (e.g., an ASIC, a FPGA, a CPLD, etc.) configured to perform operations described herein, or some combination thereof. The instructions and/or the dedicated hardware of processing circuitry 124 may be configured to cause the performance of the operations described herein in relation to HSS 114.

Database 126, which may be a Home Location Register (HLR) or HSS/HLR, includes the profiles/subscriptions for all subscribers in cellular network 100. Such subscriber profiles may include a number of parameters including, but not limited to, IMSIs and MSISDNs corresponding to a subscriber, per-IMSI AVP OI Replacement AVP parameters, COSs with which a subscriber's IMSI or IMSIs are associated, and roaming restriction policies associated with one or more of the COSs including settings for APN OI Replacement AVP Suppression attributes. FIG. 1 illustrates one example user profile 128 for a MIMIM subscriber having N+1 IMSIs, including a primary IMSI 130 and N secondary IMSIs 132, where N is an integer equal to or greater than 1 (only one secondary IMSI 132 is illustrated in FIG. 1 for convenience). As shown in FIG. 1, in the user profile 128, per-IMSI APN OI Replacement AVP parameters 134, 136, respectively, and information regarding roaming COSs 138, 140, respectively, are stored for each of the IMSIs 130, 132. Each of the COSs 138, 140 comprises an APN OI Replacement AVP Suppression attribute setting 142, 144, which designates whether the value of the APN OI Replacement AVP parameter 134, 136, respectively, should be included or excluded from a user profile downloaded to cellular device 110 for effecting service. The roaming restriction policy regarding the APN OI Replacement AVP parameter for a given IMSI may be indicated by an APN OI Replacement AVP Suppression attribute setting 142, 144, respectively, stored in the user profile for the roaming COS associated with the given IMSI. The APN OI Replacement AVP Suppression attribute settings 142, 144, respectively, may indicate that downloading of the values for the APN OI Replacement AVP parameters 134, 136 should be "Included" in a user profile downloaded to cellular device 110 or that downloading of the values for the APN OI Replacement AVP parameter should be "Excluded" from the user profile downloaded to cellular device 110 (these indications may be encoded in any desired way, such as a "1" for include and "0" for exclude or any other desired encoding scheme).

As shown in FIG. 1, the processing circuitry 124 is configured to perform operations including operation 146 of receiving an identification of a currently active IMSI of a subscriber. The identification of the currently active IMSI may be received from the network switch 112. The processing circuitry 124 may also perform operation 148 of applying an APN OI Replacement AVP Suppression attribute setting, the suppression attribute setting being specified in a roaming COS of the currently active IMSI, or in other words applying the suppression attribute setting for the APN OI Replacement AVP Suppression attribute specified for the currently active IMSI. In particular, the processing circuitry 124 may use the received IMSI and/or other information sent to the HSS 114 from the switch 112 (e.g., an MSISDN) to search the database 126 to find the user profile of the subscriber associated with the currently active IMSI and then identify the roaming COS associated with the IMSI. The processing circuitry 124 may read the APN OI Replacement AVP Suppression attribute setting specified in the roaming COS to determine the roaming restriction policy to apply. For example, using the example specified in FIG. 1, if the currently active IMSI is the Nth secondary IMSI 132 illustrated in FIG. 1, then the processing circuitry 124 would determine that the roaming restriction policy that is to be applied is to include the value of the APN OI Replacement AVP parameter 136 specified in the currently active Nth secondary IMSI 132, as the APN OI Replacement AVP Suppression attribute setting 142 specifies "INCLUDE". On the other hand, again using the example values illustrated in FIG. 1, if the primary IMSI 130 were the currently active IMSI, then the processing circuitry 124 would determine that the roaming restriction policy 138 to apply is to exclude the value of the APN OI Replacement AVP parameter 134 of the currently active primary IMSI 130, as the APN OI Replacement AVP Suppression attribute setting 140 specifies "EXCLUDE".

The processing circuitry 124 also may perform operation 150 and, upon determining that the value of the APN OI Replacement AVP parameter of the currently active IMSI is to be included in the user profile downloaded to the cellular device 110 (e.g., as in the example using the Nth secondary IMSI described above), retrieve the value of the APN OI Replacement AVP parameter for the secondary IMSI (e.g., from the database 126), for instance, the value specified in the APN OI Replacement AVP parameter 136 specified in the Nth secondary IMSI 132, as described above.

Figure 2:
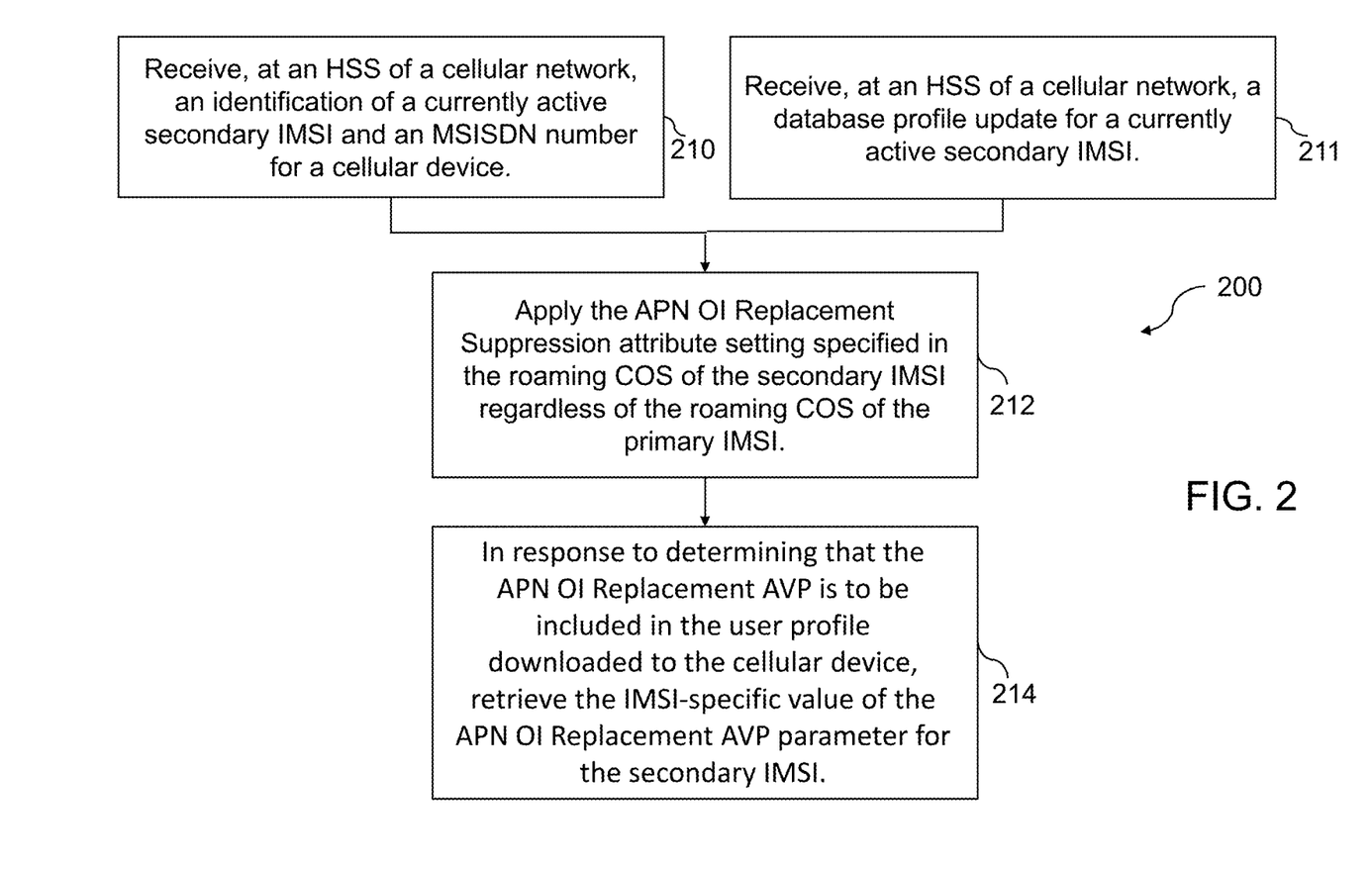
FIG. 2 is a flow diagram showing an illustrative method for applying per-IMSI APN OI Replacement AVP parameters and Suppression attribute settings for MIMM subscribers.

The above-described operations, and other operations, which may be performed by the processing circuitry 124 are described in greater detail below in relation to FIGS. 2-5. Processing circuitry 124 is configured to perform operations illustrated in the flow diagram of FIG. 2. FIG. 2 shows an illustrative method 200 for applying per-IMSI APN OI Replacement AVP Suppression attribute settings and, where applicable, values for per-IMSI APN OI Replacement AVP parameters for MIMM subscribers. Method 200 may be performed, for example, by the home subscriber server 114 of FIG. 1.

At step 210, an identification of a currently active IMSI and an MSISDN number may be received, at an HSS of a cellular network (e.g., cellular network 100 of FIG. 1), for a cellular device (e.g., cellular device 110 of FIG. 1). The cellular device may be associated with a cellular service subscriber that is configured with multiple IMSIs and multiple MSISDN numbers. The multiple IMSIs may comprise a primary IMSI (for instance, associated with the cellular service subscriber's home area) and one or more secondary IMSIs (for instance, each associated with a geographic area that differs from the subscriber's home area and that the subscriber frequents). Each of the multiple IMSIs may have an associated roaming COS that includes a roaming restriction policy that allows or suppresses VOLTE. In some implementations, the roaming restriction policy may comprise a setting for an APN OI Replacement AVP Suppression attribute. Each of the multiple IMSIs further may have IMSI-specific values for the APN OI Replacement AVP parameter.

The HSS may receive an identification of a currently active IMSI and an MSISDN number in a number of ways. By way of one example, the HSS may receive the identification of a currently active IMSI and MSISDN number upon the cellular device being newly coupled to the network, such as upon being powered on or having a cellular communication capability toggled on. This is illustrated with reference to method 300 shown in the flow diagram of FIG. 3, described in greater detail below. By way of another example, the HSS may receive the identification of a currently active IMSI and MSISDN number upon the cellular device crossing a border or boundary into a geographic region associated with the currently active IMSI. This is illustrated with reference to method 400 shown in the flow diagram of FIG. 4, described in greater detail below.

At step 211, one or more database profile updates may be received, at an HSS of a cellular network (e.g., cellular network 100 of FIG. 1), for a cellular device (e.g., cellular device 110 of FIG. 1), the database profile update(s) being for a currently active IMSI.

At step 212, in response to the currently active IMSI for the cellular device being a secondary IMSI, the APN OI Replacement AVP Suppression attribute setting specified in the roaming COS of the secondary IMSI may be applied, regardless of the APN OI Replacement AVP Suppression attribute setting specified in the roaming COS of the primary IMSI. This differs from the current state of the art wherein the APN OI Replacement AVP Suppression attribute setting specified in the roaming COS of the primary IMSI is applied even when a secondary IMSI is the currently active IMSI.

At step 214, in response to determining, from the APN OI Replacement Suppression attribute setting specified in the roaming COS of the secondary IMSI, that the value of the APN OI Replacement AVP parameter is to be included in the user profile downloaded to a cellular device of the user, the IMSI-specific value for the APN OI Replacement AVP parameter associated with the secondary IMSI may be retrieved.

Figure 3:
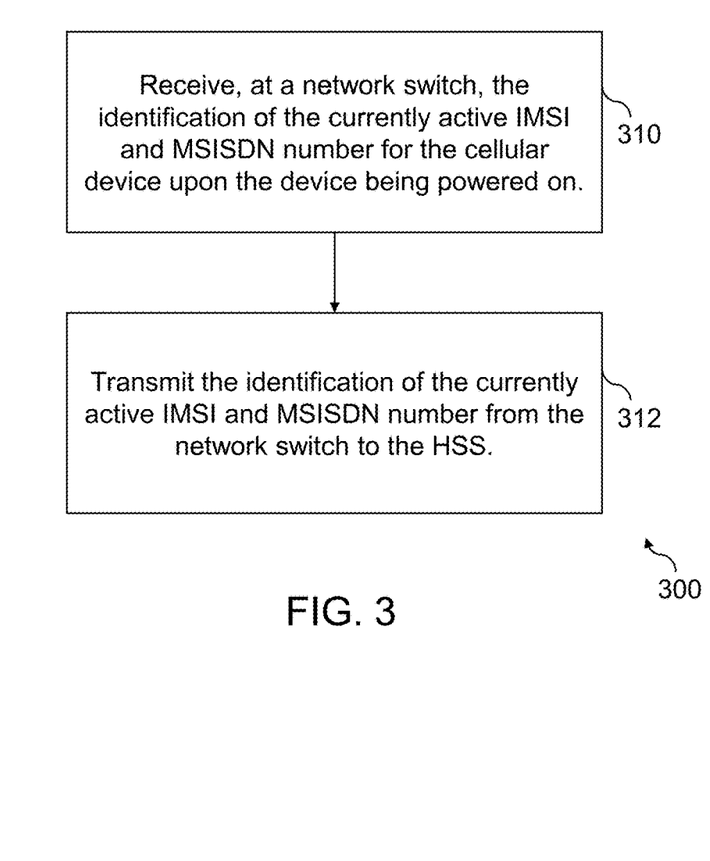
FIG. 3 is a flow diagram showing an illustrative method for receiving a currently active IMSI and MSISDN number for a cellular device.

In implementations described herein below with respect to FIG. 3, wherein the identification of the currently active IMSI and MSISDN number is received upon powering on the cellular device, the APN OI Replacement AVP Suppression attribute setting specified in the roaming COS of the secondary IMSI simply may be applied. However, in implementations described herein below with respect to FIG. 4, wherein the identification of the currently active IMSI and MSISDN number is received upon the cellular device crossing a border or boundary of a geographic region associated with the currently active IMSI or otherwise changing which IMSI is currently active, the APN OI Replacement AVP Suppression attribute setting specified in the roaming COS of the previously active IMSI must be cancelled. This is illustrated in method 500 shown in the flow diagram of FIG. 5.

Turning now to the flow diagram of FIG. 3, method 300 for receiving a currently active IMSI and MSISDN number for a cellular device will be described. Method 300 may be performed, for example, by network switch 112 of FIG. 1.

At step 310, the identification of the currently active IMSI and MSISDN number for the cellular device may be received upon the cellular device powering on. For instance, when the cellular device powers on, a registration message comprising one or more parameters (e.g., AVPs corresponding to the currently active IMSI and MSISDN derived from the SIM corresponding to the cellular device (e.g., SIM card 116 corresponding to cellular device 110)) may be transmitted from the cellular device to the network switch.

At step 312, the network switch (e.g., network switch 112 of FIG. 1) may transmit the identification of the currently active IMSI and MSISDN number from the network switch to the HSS (e.g., utilizing switching hardware 120 of network switch 112 of FIG. 1).

Figure 4:
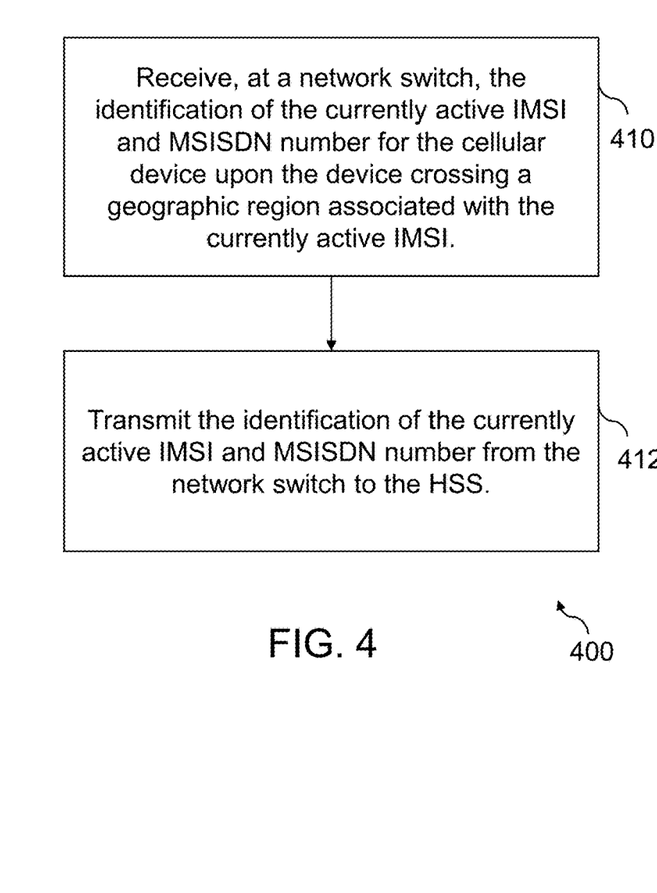
FIG. 4 is a flow diagram showing an illustrative method for receiving a currently active IMSI and MSISDN number for a cellular device.

Another example method 400 for receiving a currently active IMSI and MSISDN number for a cellular device is illustrated in FIG. 4. Method 400 may be performed, for example, by network switch 112 of FIG. 1.

At step 410, the identification of the currently active IMSI and MSISDN number for the cellular device may be received upon the cellular device crossing a border or boundary into a geographic region associated with the currently active IMSI. For instance, when the cellular device crosses the border into a geographic region associated with the currently active IMSI, a new registration message comprising one or more parameters (e.g., AVPs corresponding to the currently active IMSI and MSISDN derived from the SIM corresponding to the cellular device (e.g., SIM card 116 corresponding to cellular device 110)) may be transmitted from the cellular device to the network switch.

At step 412, the network switch (e.g., network switch 112 of FIG. 1) may transmit the identification of the currently active IMSI and MSISDN number from the network switch to the HSS (e.g., utilizing switching hardware 120 of network switch 112 of FIG. 1).

Figure 5:
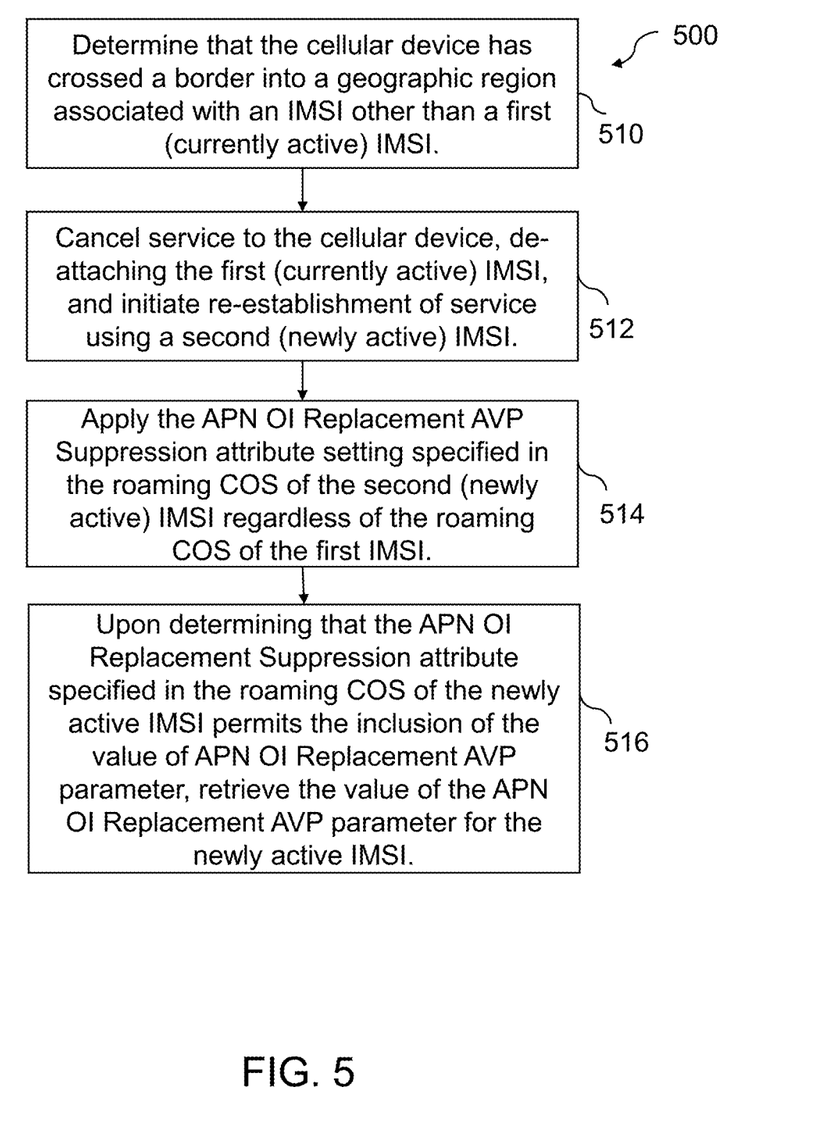
FIG. 5 is a flow diagram showing an illustrative method for applying per-IMSI APN OI Replacement AVP parameters and Suppression attribute settings for MIMM subscribers.

Turning now to FIG. 5, method 500 for applying per-IMSI APN OI Replacement AVP parameters and COS-based Suppression attribute settings for MIMM subscribers will be described. Method 500 may be performed, for example, by the HSS 114 of the cellular network 100 of FIG. 1.

At step 510, it is detected or determined that the currently active IMSI for the cellular device has changed from a first IMSI that is the currently active IMSI to a second IMSI that is to be the newly active IMSI. This may occur, for example, because the cellular device (e.g., cellular device 110 of FIG. 1) has crossed a border or boundary from a geographic region associated with the first IMSI of the multiple IMSIs into a geographic region associated with the second IMSIs of the multiple IMSIs (e.g., as described above with respect to FIG. 4). As another example, this may occur because a user has changed IMSIs within the same geographic region, for example by swapping out SIM cards or toggling a device setting. In some cases, the user's cellular device may determine that a change in IMSI is needed and may notify the network switch of the newly active IMSI, while in other cases the network switch may determine that a new IMSI is needed for the cellular device (e.g., based on tracking a location thereof) and notify the cellular device to change the IMSI. In either case, once the network switch is aware of the newly active IMSI, it may forward the information about the newly active IMSI to the HSS (along with the other information described above). The HSS may thus detect the change from the first (previously active) IMSI to the second IMSI based on receiving this information specifying the IMSI which is to be newly active IMSI. In some examples, the second IMSI that is to be the newly active IMSI is a secondary IMSI. The first IMSI, which was previously the (currently) active IMSI, may have been the primary IMSI in some cases or a secondary IMSI in other cases.

At step 512, based on determining the change in the active IMSI, service to the cellular device is canceled, de-attaching the first (currently active) IMSI, and the re-establishment of service is initiated using the second IMSI (e.g., the IMSI that is to be the newly active IMSI).

At step 514, the APN OI Replacement AVP Suppression attribute setting specified in the roaming COS of the second (newly active) IMSI is applied, regardless of the APN OI Replacement AVP suppression attribute setting specified in the roaming COS of the primary IMSI or the APN OI Replacement AVP Suppression attribute setting specified in the roaming COS of the first IMSI that was previously active. That is, the APN OI Replacement AVP Suppression attribute setting specified in the roaming COS of the primary IMSI is irrelevant with regards to whether the value of the per-IMSI APN OI Replacement AVP parameter is included or excluded from the downloaded user profiles for any of the secondary IMSIs corresponding to the cellular device.

At step 516, in response to determining, from the APN OI Replacement AVP Suppression attribute setting specified in the roaming COS of the second (newly active) IMSI, that the value of the APN OI Replacement AVP parameter is to be included in the user profile downloaded to a cellular device of the user, the value for the APN OI Replacement AVP parameter associated with the second (newly active) IMSI may be retrieved.

Figure 6:
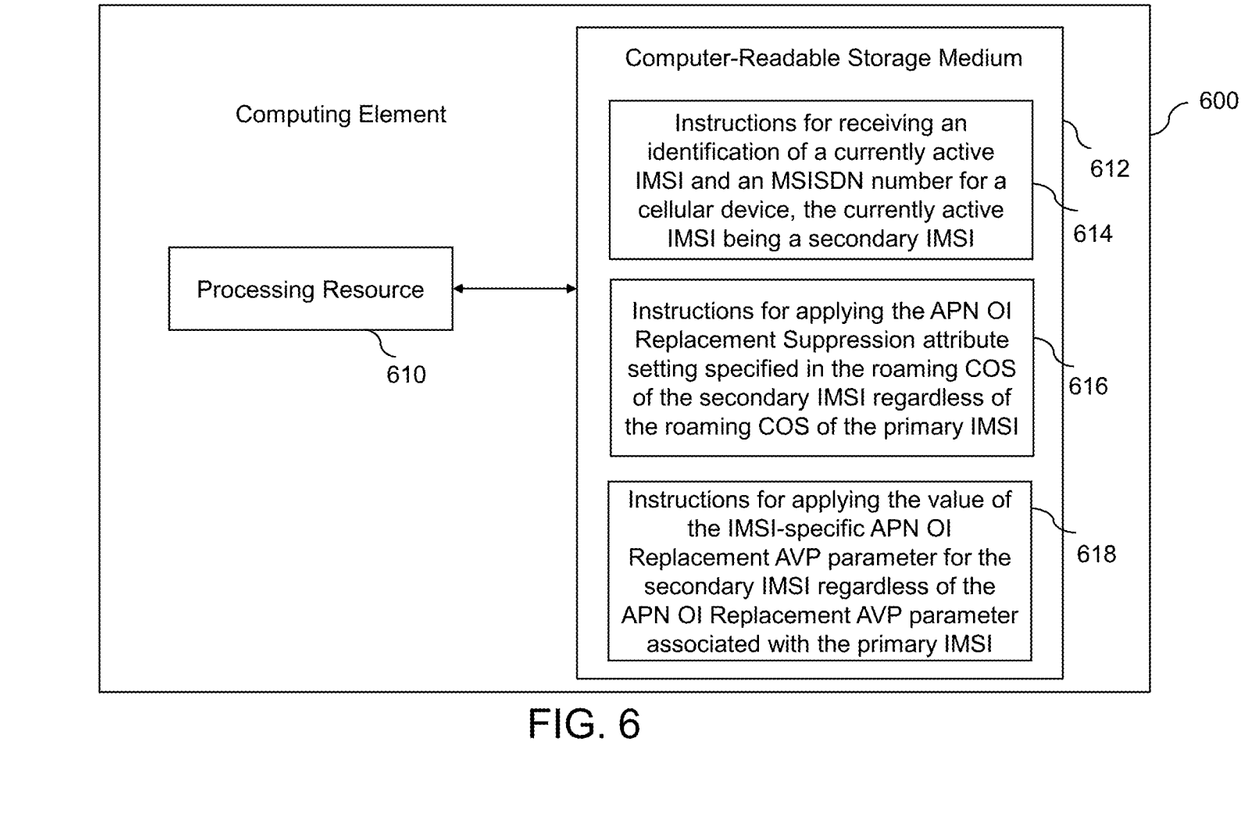
FIG. 6 is a block diagram showing an example computing element (e.g., a home subscriber server) in accordance with some implementations of the present disclosure.

FIG. 6 is a block diagram showing an example computing element 600 (e.g., a home subscriber server), in accordance with some implementations of the present disclosure. The computing element 600 may be one configuration of the HSS 114. In the example illustrated in FIG. 6, the computing element 600 includes a processing resource 610 coupled with a non-transitory, computer-readable storage medium 612 encoded with computer-executable instructions for applying IMSI-based APN OI Replacement AVP Suppression attributes for MIMMs. The processing resource 610 may include a microcontroller, a microprocessor, central processing unit core(s), graphical processing unit core(s), and/or another hardware device suitable for retrieval and/or execution of instructions from the computer-readable storage medium 612 to perform the functions related to various examples described herein. Additionally, or alternatively, the processing resource 610 may include electronic circuitry for performing the functionality of the instructions described herein.

The computer-readable storage medium 612 may be any medium suitable for storing executable instructions. Non-limiting examples of computer-readable storage medium 612 include RAM, ROM, EEPROM, flash memory, a hard disk drive, an optical disc, or the like. The computer-readable medium storage 612 may be disposed within the computing element 600, as shown in FIG. 6, in which case the executable instructions may be deemed "installed" or "embedded" on the computing element 600. Alternatively, the computer-readable storage medium 612 may be a portable (e.g., external) storage medium, and may be part of an "installation package." The instructions stored on the computer-readable storage medium 612 may be useful for implementing at least the methods described herein (e.g., the methods shown in FIGS. 2, 5, and 6).

In the context of the present example, the computer-readable storage medium 612 is encoded with a set of executable instructions 614 and 616. It should be understood that part or all of the executable instructions and/or electronic circuits included within one block may, in alternate implementations, be included in a different block shown in the figures or in a different block not shown.

Instructions 614, upon execution, may cause the processing resource 610 to receive an identification of a currently active IMSI and an MSISDN number for a cellular device (e.g., cellular device 110 of FIG. 1). The cellular device may be associated with a cellular service subscriber that is configured with multiple IMSIs and multiple MSISDN numbers. The multiple IMSIs may comprise a primary IMSI (for instance, associated with the cellular service subscriber's home area) and one or more secondary IMSIs (for instance, each associated with a geographic area that differs from the subscriber's home area and that the subscriber frequents). Each of the multiple IMSIs may have an associated APN OI Replacement AVP parameter and a roaming COS that includes a roaming restriction policy that allows or suppresses VOLTE. In some implementations, the roaming restriction policy may comprise an APN OI Replacement AVP Suppression attribute setting that specifies the inclusion or exclusion of the value of the APN OI Replacement AVP parameter) in a downloaded user profile.

Instructions 616, upon execution, may cause the processing resource 610 to, in response to the currently active IMSI for the cellular device being a secondary IMSI, apply the APN OI Replacement AVP Suppression attribute setting specified in the roaming COS of the secondary IMSI, regardless of the APN OI Replacement AVP Suppression attribute setting specified in the roaming COS of the primary IMSI.

Instructions 618, upon execution, may cause the processing resource 610 to, in response to determining, from the APN OI Replacement Suppression attribute setting specified in the roaming COS of the secondary IMSI, that the value of the APN OI Replacement AVP parameter is to be included in the user profile downloaded to a cellular device of the user, retrieve the value for the IMSI-specific APN OI Replacement AVP parameter associated with the secondary IMSI, regardless of the APN OI replacement AVP parameter associated with the primary IMSI.

The processing described herein with reference to FIGS. 1 through 6 may be implemented in the form of executable instructions stored on a machine-readable medium and executed by a processing resource (e.g., a microcontroller, a microprocessor, central processing unit core(s), etc.) and/or in the form of other types of electronic circuitry (e.g., an application-specific integrated circuit (ASIC), a field programmable gate array (FPGA), etc.). For example, this processing may be performed by one or more computing systems or elements of various forms, such as the system described above with reference to FIG. 1.

The technology described herein includes various steps, examples of which have been described above. As described further above, these steps may be performed by hardware components or may be embodied in machine-executable instructions, which may be used to cause a processor programmed with the instructions to perform the steps. Alternatively, at least some steps may be performed by a combination of hardware, software, and/or firmware.

The technology described herein may be provided as a computer program product, which may include a tangible machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/ machine-readable medium suitable for storing electronic instructions (e.g., computer programming code, such as software or firmware).

In the technical description herein, numerous specific details are set forth in order to provide a thorough understanding of example implementations. It will be apparent, however, to one skilled in the art that implementations described herein may be practiced without some of these specific details. In other instances, well-known structures and devices are shown in block diagram form.

The terminology used herein is for the purpose of describing example implementations only and is not intended to be limiting. As used herein, the singular forms "a," "an," and "the" are intended to include the plural forms as well, unless the context clearly indicates otherwise. The term "plurality," as used herein, is defined as two, or more than two. The term "and/or" as used herein refers to and encompasses any and all possible combinations of one or more of the associated listed items. As used herein, the term "includes" means includes but not limited to, and the term "including" means including but not limited to. The term "based on" means based at least in part on. If the specification states a component or feature "may," "can," "could," or "might" be included or have a characteristic, that particular component or feature is not required to be included or have the characteristic. As used in the description herein, the meaning of "in" includes "in" and "on" unless the context clearly dictates otherwise.

Various methods described herein may be practiced by combining one or more machine-readable storage media containing the code according to example embodiments described herein with appropriate standard computer hardware to execute the code contained therein. An apparatus for practicing various embodiments described herein may involve one or more computing elements or computers (or one or more processors within a single computer) and storage systems containing or having network access to computer program(s) coded in accordance with various methods described herein, and the method steps of various embodiments described herein may be accomplished by modules, routines, subroutines, or subparts of a computer program product.

In the foregoing description, numerous details are set forth to provide an understanding of the subject matter disclosed herein. However, implementations may be practiced without some or all of these details. Other implementations may include modifications and variations from the details discussed above. It is intended that the following claims cover such modifications and variations.

What is claimed is:

1. A method, comprising:
receiving at a home subscriber server (HSS) of a cellular network, an identification of a currently active International Mobile Subscriber Identification (IMSI) and a Mobile Subscriber Integrated Service Digital Network (MSISDN) number for a cellular device,
wherein the cellular device is associated with a cellular service subscriber that has multiple IMSIs and multiple MSISDNs,
wherein the multiple IMSIs comprise a primary IMSI and one or more secondary IMSIs, and
wherein each of the multiple IMSIs has an associated roaming Class of Service (COS) that includes a roaming restriction policy that allows or suppresses Voice Over LTE (VOLTE); and
in response to the currently active IMSI for the cellular device being a secondary IMSI, applying the roaming restriction policy specified in the roaming COS of the secondary IMSI regardless of the roaming COS of the primary IMSI,
wherein applying the roaming restriction policy specified in the roaming COS of the secondary IMSI comprises allowing or suppressing VOLTE for the cellular device in accordance with the roaming restriction policy specified in the roaming COS of the secondary IMSI.

2. The method of claim 1, wherein the roaming restriction policy specified in the roaming COS of the secondary IMSI comprises a suppression setting for an Access Point Name (APN) Operator Identifier (OI) Replacement Attribute Value Pair (AVP) parameter.

3. The method of claim 2, wherein the roaming restriction policy specified in the roaming COS of the secondary IMSI is set to include or exclude a value of the APN OI Replacement AVP parameter based on whether VOLTE is available in a geographic area associated with the secondary IMSI.

4. The method of claim 2, wherein the roaming restriction policy specified in the roaming COS of the secondary IMSI is set to include or exclude a value of the APN OI Replacement AVP parameter based on whether a service contract associated with the cellular service subscriber permits VOLTE.

5. The method of claim 1, further comprising:
receiving, at a network switch, the identification of the currently active IMSI and MSISDN number from the cellular device upon the cellular device being powered on within the cellular network; and
transmitting the identification of the currently active IMSI and MSISDN number from the network switch to the HSS.

6. The method of claim 1, further comprising:
receiving, at a network switch, the identification of the currently active IMSI and MSISDN number from the cellular device upon the cellular device crossing a border into a geographic region associated with the currently active IMSI; and
transmitting the identification of the currently active IMSI and MSISDN number from the network switch to the HSS.

7. The method of claim 1, further comprising:
determining that the cellular device has changed the currently active IMSI from the secondary IMSI to another of the secondary IMSIs; and
in response to determining that the cellular device has changed the currently active IMSI from the secondary IMSI to another of the secondary IMSIs:
canceling service to the cellular device by de-attaching the secondary IMSI;
establishing service to the cellular device using the other of the secondary IMSIs; and
applying the roaming restriction policy specified in the roaming COS of the other of the secondary IMSIs regardless of the roaming COS of the primary IMSI,
wherein applying the roaming restriction policy specified in the roaming COS of the other of the secondary IMSIs comprises allowing or suppressing VOLTE for the cellular device in accordance with the roaming restriction policy specified in the roaming COS of the other secondary IMSI.

8. The method of claim 7, wherein the determining that the cellular device has changed the currently active IMSI from the secondary IMSI to another of the secondary IMSIs comprises receiving, at the HSS, an identification of the other of the secondary IMSIs.

9. A non-transitory computer-readable medium having stored thereon, a set of computer-executable instructions configured to, when executed by one or more processors of a home subscriber server (HSS) of a cellular network, cause the HSS to:

receive an identification of a currently active International Mobile Subscriber Identification (IMSI) and a Mobile Subscriber Integrated Service Digital Network (MSISDN) number for a cellular device,
wherein the cellular device is associated with a cellular service subscriber that has multiple IMSIs and multiple MSISDNs,
wherein the multiple IMSIs comprise a primary IMSI and one or more secondary IMSIs, and
wherein each of the multiple IMSIs has an associated roaming Class of Service (COS) that includes a roaming restriction policy that allows or suppresses Voice Over LTE (VOLTE); and in response to the currently active IMSI for the cellular device being a secondary IMSI, apply the roaming restriction policy specified in the roaming COS of the secondary IMSI regardless of the roaming COS of the primary IMSI,
wherein applying the roaming restriction policy specified in the roaming COS of the secondary IMSI comprises allowing or suppressing VOLTE for the cellular device in accordance with the roaming restriction policy specified in the roaming COS of the secondary IMSI.

10. The non-transitory computer-readable medium of claim 9, wherein the roaming restriction policy specified in the roaming COS of the secondary IMSI comprises a suppression setting for an Access Point Name (APN) Operator Identifier (OI) Replacement Attribute Value Pair (AVP) parameter.

11. The non-transitory computer-readable medium of claim 10, wherein the roaming restriction policy specified in the roaming COS of the secondary IMSI is set to include or exclude a value of the APN OI Replacement AVP parameter based on whether VOLTE is available in a geographic area associated with the secondary IMSI.

12. The non-transitory computer-readable medium of claim 10, wherein the roaming restriction policy specified in the roaming COS of the secondary IMSI is set to include or exclude a value of the APN OI Replacement AVP parameter based on whether a service contract associated with the cellular service subscriber permits VOLTE.

13. The non-transitory computer-readable medium of claim 9, wherein the set of computer-executable instructions, when executed, is further configured to cause the HSS to: determine that the cellular device has changed the currently active IMSI from the secondary IMSI to another of the secondary IMSIs; and in response to determining that the cellular device has changed the currently active IMSI from the secondary IMSI to another of the secondary IMSIs: cancel service to the cellular device by de-attaching the secondary IMSI; establish service to the cellular device using the other of the secondary IMSIs; and apply the roaming restriction policy specified in the roaming COS of the other of the secondary IMSIs regardless of the roaming COS of the primary IMSI, wherein applying the roaming restriction policy specified in the roaming COS of the other of the secondary IMSIs comprises allowing or suppressing VOLTE for the cellular device in accordance with the roaming restriction policy specified in the roaming COS of the other secondary IMSI.

14. The non-transitory computer-readable medium of claim 9, wherein the determining that the cellular device has changed the currently active IMSI from the secondary IMSI to another of the secondary IMSIs comprises receiving an identification of the other of the secondary IMSIs.

15. A home subscriber server (HSS) for a cellular network, comprising:

one or more processors configured to:
receive an identification of a currently active International Mobile Subscriber Identification (IMSI) and a Mobile Subscriber Integrated Service Digital Network (MSISDN) number for a cellular device,
wherein the cellular device is associated with a cellular service subscriber that has multiple IMSIs and multiple MSISDNs,
wherein the multiple IMSIs comprise a primary IMSI and one or more secondary IMSIs, and
wherein each of the multiple IMSIs has an associated roaming Class of Service (COS) that includes a roaming restriction policy that allows or suppresses Voice Over LTE (VOLTE); and in response to the currently active IMSI for the cellular device being a secondary IMSI, apply the roaming restriction policy specified in the roaming COS of the secondary IMSI regardless of the roaming COS of the primary IMSI,
wherein applying the roaming restriction policy specified in the roaming COS of the secondary IMSI comprises allowing or suppressing VOLTE for the cellular device in accordance with the roaming restriction policy specified in the roaming COS of the secondary IMSI.

16. The HSS of claim 15, wherein the roaming restriction policy specified in the roaming COS of the secondary IMSI comprises an Access Point Name (APN) Operator Identifier (OI) Replacement Attribute Value Pair (AVP) parameter.

17. The HSS of claim 16, wherein the roaming restriction policy specified in the roaming COS of the secondary IMSI is set to include or exclude a value of the APN OI Replacement AVP parameter based on whether VOLTE is available in a geographic area associated with the secondary IMSI.

18. The HSS of claim 16, wherein the roaming restriction policy specified in the roaming COS of the secondary IMSI is set to include or exclude a value of the APN OI Replacement AVP parameter based on whether a service contract associated with the cellular service subscriber permits VOLTE.

19. The HSS of claim 15, wherein the one or more processors further are configured to:
determine that the cellular device has changed the currently active IMSI from the secondary IMSI to another of the secondary IMSIs; and
in response to determining that the cellular device has changed the currently active IMSI from the secondary IMSI to another of the secondary IMSIs:
cancel service to the cellular device by de-attaching the secondary IMSI;
establish service to the cellular device using the other of the secondary IMSIs; and
apply the roaming restriction policy specified in the roaming COS of the other of the secondary IMSIs regardless of the roaming COS of the primary IMSI,
wherein applying the roaming restriction policy specified in the roaming COS of the other of the secondary IMSIs comprises allowing or suppressing VOLTE for the cellular device in accordance with the roaming restriction policy specified in the roaming COS of the other secondary IMSI.

20. The HSS of claim 19, wherein the HSS is configured to determine that the cellular device has changed the currently active IMSI from the secondary IMSI to another of the secondary IMSIs by receiving an identification of the other of the secondary IMSIs.

\* \* \* \* \*